(12) United States Patent
Greenfield et al.

(10) Patent No.: US 8,176,545 B1
(45) Date of Patent: May 8, 2012

(54) INTEGRATED POLICY CHECKING SYSTEM AND METHOD

(75) Inventors: Daniel Leo Greenfield, Honolulu, HI (US); John Shigeto Minami, Honolulu, HI (US); Robin Yasu Uyeshiro, Kailua, HI (US)

(73) Assignee: NVIDIA Corporation, Santa Clara, CA (US)

( * ) Notice: Subject to any disclaimer, the term of this patent is extended or adjusted under 35 U.S.C. 154(b) by 1560 days.

(21) Appl. No.: 10/741,972

(22) Filed: Dec. 19, 2003

(51) Int. Cl.
*H04L 29/06* (2006.01)

(52) U.S. Cl. ............................................ 726/14; 726/13

(58) Field of Classification Search ...................... 726/14
See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | 364/200 |
| 4,839,851 A | 6/1989 | Maki | 364/900 |
| 4,965,716 A | 10/1990 | Sweeney | |
| 4,991,133 A | 2/1991 | Davis et al. | |
| 5,012,489 A | 4/1991 | Burton et al. | 375/8 |
| 5,056,058 A | 10/1991 | Hirata et al. | 364/900 |
| 5,058,110 A | 10/1991 | Beach et al. | |
| 5,161,193 A | 11/1992 | Lampson et al. | 380/49 |
| 5,163,131 A | 11/1992 | Row et al. | 395/200 |
| 5,307,413 A | 4/1994 | Denzer | 380/49 |
| 5,426,694 A | 6/1995 | Hebert | 379/242 |
| 5,430,727 A | 7/1995 | Callon | 370/85.13 |
| 5,440,551 A | 8/1995 | Suzuki | 370/60 |
| 5,442,637 A | 8/1995 | Nguyen | |
| 5,448,558 A | 9/1995 | Gildea et al. | |
| 5,455,599 A | 10/1995 | Cabral et al. | 345/133 |
| 5,485,460 A | 1/1996 | Schrier et al. | 370/94.1 |
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,544,357 A | 8/1996 | Huei | 395/600 |
| 5,546,453 A | 8/1996 | Hebert | |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |

(Continued)

FOREIGN PATENT DOCUMENTS

AU      4595297      5/1998

(Continued)

OTHER PUBLICATIONS

Muller, Raimund, LON-das universelle Netzwerk Elektronik 22-1991.

(Continued)

*Primary Examiner* — Nasser Goodarzi
*Assistant Examiner* — Carlton Johnson
(74) *Attorney, Agent, or Firm* — Zilka-Kotab, PC

(57) ABSTRACT

A system and method are provided for validating a security service associated with packets communicated on a network. A hash of a security service associated with packets communicated on a network is generated. In use, the security service associated with the packets is validated utilizing the hash.

35 Claims, 8 Drawing Sheets

U.S. PATENT DOCUMENTS

| | | | | |
|---|---|---|---|---|
| 5,621,434 | A | 4/1997 | Marsh | 345/145 |
| 5,625,678 | A | 4/1997 | Blomfield-Brown | 379/93 |
| 5,625,825 | A | 4/1997 | Rostoker et al. | 395/730 |
| 5,634,015 | A | 5/1997 | Chang et al. | 395/309 |
| 5,636,371 | A | 6/1997 | Yu | 395/500 |
| 5,640,394 | A | 6/1997 | Schrier et al. | 370/389 |
| 5,650,941 | A | 7/1997 | Coelho et al. | 364/514 |
| 5,663,951 | A | 9/1997 | Danneels et al. | 370/230 |
| 5,664,162 | A | 9/1997 | Dye | 345/521 |
| 5,666,362 | A | 9/1997 | Chen et al. | 370/420 |
| 5,675,507 | A | 10/1997 | Bobo, II | 364/514 |
| 5,678,060 | A | 10/1997 | Yokoyama et al. | 395/831 |
| 5,680,605 | A | 10/1997 | Torres | 395/603 |
| 5,687,314 | A | 11/1997 | Osman et al. | 395/200 |
| 5,696,899 | A | 12/1997 | Kalwitz | 395/200.1 |
| 5,699,350 | A | 12/1997 | Kraslavsky | 370/254 |
| 5,701,316 | A | 12/1997 | Alferness et al. | 371/53 |
| 5,717,691 | A * | 2/1998 | Dighe et al. | 370/401 |
| 5,727,149 | A | 3/1998 | Hirata et al. | 395/200.8 |
| 5,734,852 | A | 3/1998 | Zias et al. | 395/334 |
| 5,734,865 | A | 3/1998 | Yu | 395/500 |
| 5,748,905 | A | 5/1998 | Hauser et al. | 395/200.79 |
| 5,754,540 | A | 5/1998 | Liu et al. | 370/315 |
| 5,754,556 | A | 5/1998 | Ramseyer et al. | 371/10.3 |
| 5,761,281 | A | 6/1998 | Baum et al. | 379/93.29 |
| 5,778,178 | A | 7/1998 | Arunachalam | 395/200.33 |
| 5,790,546 | A | 8/1998 | Dobbins et al. | 370/400 |
| 5,790,676 | A | 8/1998 | Ganesan et al. | 380/23 |
| 5,802,287 | A | 9/1998 | Rostoker et al. | 395/200.8 |
| 5,802,306 | A | 9/1998 | Hunt | 395/200.58 |
| 5,805,816 | A | 9/1998 | Picazo, Jr. et al. | 395/200.53 |
| 5,809,235 | A | 9/1998 | Sharma et al. | 395/200.6 |
| 5,815,516 | A | 9/1998 | Aaker et al. | 371/53 |
| 5,818,935 | A | 10/1998 | Maa | 380/20 |
| 5,826,032 | A | 10/1998 | Finn et al. | 395/200.66 |
| 5,828,880 | A | 10/1998 | Hanko | |
| 5,854,750 | A | 12/1998 | Phillips et al. | 364/478.04 |
| 5,870,549 | A | 2/1999 | Bobo, II | 395/200.36 |
| 5,870,622 | A | 2/1999 | Gulick et al. | 395/800.35 |
| 5,872,919 | A | 2/1999 | Wakeland | 395/200.6 |
| 5,877,764 | A | 3/1999 | Feitelson et al. | 345/347 |
| 5,894,557 | A | 4/1999 | Bade et al. | 395/200.58 |
| 5,909,546 | A | 6/1999 | Osborne | 395/200.42 |
| 5,918,051 | A | 6/1999 | Savitzky et al. | 395/683 |
| 5,920,732 | A | 7/1999 | Riddle | 395/876 |
| 5,923,892 | A | 7/1999 | Levy | 395/800.31 |
| 5,935,268 | A | 8/1999 | Weaver | 714/758 |
| 5,937,169 | A | 8/1999 | Connery et al. | 395/200.8 |
| 5,941,988 | A | 8/1999 | Bhagwat et al. | 713/201 |
| 5,943,481 | A | 8/1999 | Wakeland | 395/200.6 |
| 5,946,487 | A | 8/1999 | Dangelo | 395/705 |
| 5,966,534 | A | 10/1999 | Cooke et al. | 395/705 |
| 5,968,161 | A | 10/1999 | Southgate | 712/37 |
| 5,974,518 | A | 10/1999 | Nogradi | 711/173 |
| 5,991,299 | A | 11/1999 | Radogna et al. | 370/392 |
| 5,999,974 | A | 12/1999 | Ratcliff et al. | 709/224 |
| 6,014,699 | A | 1/2000 | Ratcliff et al. | 709/224 |
| 6,016,511 | A | 1/2000 | Cook | |
| 6,034,963 | A | 3/2000 | Minami et al. | 370/401 |
| 6,046,980 | A | 4/2000 | Packer | 370/230 |
| 6,049,857 | A | 4/2000 | Watkins | 711/207 |
| 6,061,368 | A | 5/2000 | Hitzelberger | 370/537 |
| 6,061,742 | A | 5/2000 | Stewart et al. | 709/250 |
| 6,067,407 | A | 5/2000 | Wadsworth et al. | |
| 6,076,115 | A | 6/2000 | Sambamurthy et al. | 709/250 |
| 6,078,736 | A | 6/2000 | Guccione | 395/500.17 |
| 6,081,846 | A | 6/2000 | Hyder et al. | 709/250 |
| 6,092,110 | A | 7/2000 | Maria et al. | 709/225 |
| 6,092,229 | A | 7/2000 | Boyle et al. | 714/748 |
| 6,098,188 | A | 8/2000 | Kalmanek, Jr. et al. | 714/746 |
| 6,101,543 | A | 8/2000 | Alden et al. | 709/229 |
| 6,122,670 | A | 9/2000 | Bennet et al. | 709/236 |
| 6,141,705 | A | 10/2000 | Anand et al. | |
| 6,151,625 | A | 11/2000 | Swales et al. | 709/218 |
| 6,157,955 | A | 12/2000 | Narad et al. | 709/228 |
| 6,172,980 | B1 | 1/2001 | Flanders et al. | 370/401 |
| 6,172,990 | B1 | 1/2001 | Deb et al. | 370/474 |
| 6,173,333 | B1 | 1/2001 | Jolitz et al. | 709/240 |
| 6,182,228 | B1 | 1/2001 | Boden | 713/201 |
| 6,185,619 | B1 | 2/2001 | Joffe et al. | 709/229 |
| 6,208,651 | B1 | 3/2001 | Van Renesse et al. | 370/392 |
| 6,212,560 | B1 | 4/2001 | Fairchild | |
| 6,226,680 | B1 | 5/2001 | Boucher et al. | 709/230 |
| 6,230,193 | B1 | 5/2001 | Arunkumar et al. | 709/218 |
| 6,233,626 | B1 | 5/2001 | Swales et al. | 710/11 |
| 6,247,060 | B1 | 6/2001 | Boucher et al. | 709/238 |
| 6,247,068 | B1 | 6/2001 | Kyle | 709/328 |
| 6,253,321 | B1 * | 6/2001 | Nikander et al. | 713/160 |
| 6,272,639 | B1 | 8/2001 | Holden et al. | |
| 6,327,625 | B1 | 12/2001 | Wang et al. | 709/235 |
| 6,330,248 | B1 | 12/2001 | Krishna et al. | |
| 6,330,659 | B1 | 12/2001 | Poff et al. | 712/34 |
| 6,334,153 | B2 | 12/2001 | Boucher et al. | 709/230 |
| 6,341,129 | B1 | 1/2002 | Schroeder et al. | 370/354 |
| 6,345,301 | B1 | 2/2002 | Burns et al. | 709/230 |
| 6,347,347 | B1 | 2/2002 | Brown et al. | 710/23 |
| 6,370,599 | B1 | 4/2002 | Anand et al. | |
| 6,389,479 | B1 | 5/2002 | Boucher et al. | 709/243 |
| 6,389,537 | B1 | 5/2002 | Davis et al. | 713/187 |
| 6,393,487 | B2 | 5/2002 | Boucher et al. | 709/238 |
| 6,397,316 | B2 | 5/2002 | Fesas, Jr. | 711/200 |
| 6,427,169 | B1 | 7/2002 | Elzur | 709/224 |
| 6,427,171 | B1 | 7/2002 | Craft et al. | 709/230 |
| 6,427,173 | B1 | 7/2002 | Boucher et al. | 709/238 |
| 6,430,628 | B1 | 8/2002 | Conner | 710/5 |
| 6,434,620 | B1 | 8/2002 | Boucher et al. | 709/230 |
| 6,460,080 | B1 | 10/2002 | Shah et al. | 709/224 |
| 6,470,415 | B1 | 10/2002 | Starr et al. | 711/104 |
| 6,530,061 | B1 | 3/2003 | Labatte | 714/807 |
| 6,591,302 | B2 | 7/2003 | Boucher et al. | 709/230 |
| 6,609,225 | B1 | 8/2003 | Ng | 714/781 |
| 6,629,141 | B2 | 9/2003 | Elzur et al. | 709/224 |
| 6,658,480 | B2 | 12/2003 | Boucher et al. | 709/239 |
| 6,687,758 | B2 | 2/2004 | Craft et al. | 709/250 |
| 6,697,868 | B2 | 2/2004 | Craft et al. | 709/230 |
| 6,751,665 | B2 | 6/2004 | Philbrick et al. | 709/224 |
| 6,757,746 | B2 | 6/2004 | Boucher et al. | 709/250 |
| 6,789,147 | B1 * | 9/2004 | Kessler et al. | 710/200 |
| 6,807,581 | B1 | 10/2004 | Starr et al. | 709/250 |
| 6,820,117 | B1 | 11/2004 | Johnson | |
| 6,882,624 | B1 | 4/2005 | Ma | |
| 6,915,426 | B1 * | 7/2005 | Carman et al. | 713/168 |
| 6,938,092 | B2 | 8/2005 | Burns | 709/230 |
| 6,941,386 | B2 | 9/2005 | Craft et al. | 709/250 |
| 6,965,941 | B2 | 11/2005 | Boucher et al. | 709/230 |
| 6,996,070 | B2 | 2/2006 | Starr et al. | |
| 7,013,482 | B1 | 3/2006 | Krumel | |
| 7,042,898 | B2 | 5/2006 | Blightman et al. | |
| 7,340,549 | B2 | 3/2008 | Hoese et al. | |
| 2001/0021949 | A1 | 9/2001 | Blightman et al. | 709/219 |
| 2001/0023460 | A1 | 9/2001 | Boucher et al. | 709/250 |
| 2001/0027496 | A1 | 10/2001 | Boucher et al. | 709/250 |
| 2001/0036196 | A1 | 11/2001 | Blightman et al. | 370/465 |
| 2001/0037397 | A1 | 11/2001 | Boucher et al. | |
| 2001/0037406 | A1 | 11/2001 | Philbrick et al. | 709/250 |
| 2001/0047433 | A1 | 11/2001 | Boucher et al. | 709/250 |
| 2002/0055993 | A1 | 5/2002 | Shah et al. | 709/223 |
| 2002/0085562 | A1 | 7/2002 | Hufferd et al. | 370/392 |
| 2002/0087732 | A1 | 7/2002 | Boucher et al. | 709/250 |
| 2002/0091844 | A1 | 7/2002 | Craft et al. | 709/230 |
| 2002/0095519 | A1 | 7/2002 | Philbrick et al. | 709/250 |
| 2002/0120899 | A1 | 8/2002 | Gahan et al. | 714/748 |
| 2002/0147839 | A1 | 10/2002 | Boucher et al. | 709/238 |
| 2002/0156927 | A1 | 10/2002 | Boucher et al. | 709/250 |
| 2002/0161919 | A1 | 10/2002 | Boucher et al. | 709/238 |
| 2002/0163888 | A1 | 11/2002 | Grinfeld | 370/235 |
| 2003/0005142 | A1 | 1/2003 | Elzur et al. | 709/232 |
| 2003/0005143 | A1 | 1/2003 | Elzur et al. | 709/232 |
| 2003/0014544 | A1 | 1/2003 | Pettey | 709/249 |
| 2003/0014624 | A1 * | 1/2003 | Maturana et al. | 713/151 |
| 2003/0016669 | A1 | 1/2003 | Pfister et al. | 370/392 |
| 2003/0031172 | A1 | 2/2003 | Grinfeld | 370/389 |
| 2003/0037237 | A1 * | 2/2003 | Abgrall et al. | 713/166 |
| 2003/0046330 | A1 | 3/2003 | Hayes | 709/201 |
| 2003/0046418 | A1 | 3/2003 | Raval et al. | 709/237 |
| 2003/0056009 | A1 | 3/2003 | Mizrachi et al. | 709/245 |
| 2003/0058870 | A1 | 3/2003 | Mizrachi et al. | 370/395.52 |

| | | | | |
|---|---|---|---|---|
| 2003/0061505 | A1 | 3/2003 | Sperry et al. | 713/200 |
| 2003/0066011 | A1 | 4/2003 | Oren | 714/758 |
| 2003/0079033 | A1 | 4/2003 | Craft et al. | 709/230 |
| 2003/0081600 | A1* | 5/2003 | Blaker et al. | 370/389 |
| 2003/0084185 | A1 | 5/2003 | Pinkerton | |
| 2003/0095567 | A1 | 5/2003 | Lo et al. | 370/466 |
| 2003/0108033 | A1 | 6/2003 | Raisanen et al. | |
| 2003/0115350 | A1 | 6/2003 | Uzrad-Nali et al. | 709/231 |
| 2003/0115417 | A1 | 6/2003 | Corrigan | 711/118 |
| 2003/0128704 | A1 | 7/2003 | Mizrachi et al. | 370/394 |
| 2003/0140124 | A1 | 7/2003 | Burns | 709/220 |
| 2003/0145101 | A1 | 7/2003 | Mitchell et al. | 709/236 |
| 2003/0145270 | A1 | 7/2003 | Holt | 714/766 |
| 2003/0161327 | A1* | 8/2003 | Vlodavsky et al. | 370/395.52 |
| 2003/0167346 | A1 | 9/2003 | Craft et al. | 709/250 |
| 2003/0200284 | A1 | 10/2003 | Philbrick et al. | 709/219 |
| 2004/0003126 | A1 | 1/2004 | Boucher et al. | 709/250 |
| 2004/0054813 | A1 | 3/2004 | Boucher et al. | 709/250 |
| 2004/0062246 | A1 | 4/2004 | Boucher et al. | 370/392 |
| 2004/0064578 | A1 | 4/2004 | Boucher et al. | 709/236 |
| 2004/0064589 | A1 | 4/2004 | Boucher et al. | 709/250 |
| 2004/0064590 | A1 | 4/2004 | Starr et al. | 709/250 |
| 2004/0073703 | A1 | 4/2004 | Boucher et al. | 709/245 |
| 2004/0078462 | A1 | 4/2004 | Philbrick et al. | 709/22 |
| 2004/0088262 | A1 | 5/2004 | Boucher et al. | 705/65 |
| 2004/0100952 | A1 | 5/2004 | Boucher et al. | 370/389 |
| 2004/0111535 | A1 | 6/2004 | Boucher et al. | 709/250 |
| 2004/0117509 | A1 | 6/2004 | Craft et al. | 709/250 |
| 2004/0158640 | A1 | 8/2004 | Philbrick et al. | 709/230 |
| 2004/0158793 | A1 | 8/2004 | Blightman et al. | 714/758 |
| 2004/0240435 | A1 | 12/2004 | Boucher et al. | 370/352 |
| 2005/0122986 | A1 | 6/2005 | Starr et al. | 370/412 |
| 2005/0141561 | A1 | 6/2005 | Craft et al. | 370/474 |
| 2005/0160139 | A1 | 7/2005 | Boucher et al. | 709/203 |
| 2005/0175003 | A1 | 8/2005 | Craft et al. | 370/389 |
| 2005/0182841 | A1 | 8/2005 | Sharp | 709/228 |
| 2005/0198198 | A1 | 9/2005 | Craft et al. | 709/217 |
| 2005/0204058 | A1 | 9/2005 | Philbrick et al. | 709/238 |
| 2005/0278459 | A1 | 12/2005 | Boucher et al. | 709/250 |
| 2006/0010238 | A1 | 1/2006 | Craft et al. | 709/227 |
| 2007/0062245 | A1 | 3/2007 | Fuller et al. | 72/413 |
| 2007/0253430 | A1 | 11/2007 | Minami et al. | |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692 | 5/1998 |
| CA | 2287413 | 11/1998 |
| CA | 2328829 | 12/1999 |
| CA | 2265692 C | 8/2001 |
| CN | 1237295 A | 12/1999 |
| CN | 1266512 T | 9/2000 |
| CN | 1305681 T | 7/2001 |
| JP | 3022159 A | 1/1991 |
| JP | 3273350 A | 12/1991 |
| JP | 5183603 A | 7/1993 |
| JP | 6309251 A | 11/1994 |
| JP | 2000235536 A | 8/2000 |
| TW | 447205 B | 7/2001 |
| TW | 448407 B | 8/2001 |
| WO | WO98/21655 | 5/1998 |
| WO | 9835480 A1 | 8/1998 |
| WO | WO 98/50852 | 11/1998 |
| WO | WO 99/65219 | 12/1999 |
| WO | WO 01/13583 | 2/2001 |
| WO | WO 01/28179 | 4/2001 |
| WO | 0227519 A1 | 4/2002 |
| WO | WO 02/39302 | 5/2002 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |

OTHER PUBLICATIONS

Abbot, Mark B.; Peterson, Larry L., "Increasing Network Trhoguhput by Integrating Protocol Layers" IEEE 1993.

Wright, Maury, Low-Cost Control LANs Add Automation to Homes, Autos, and Offices EDN-Technology Jul. 20, 1992.

Preston, David J., "Internet Protocols Migrate to Silicon for Networking Devices" Electronic Design Apr. 14, 1997.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Wayner, "Sun Gambles on Java Chops", Bytes, Nov. 1996.

Raz, "Real Time Program Language Accelerator", WO 98/21655, May 1998.

Agrawal et al. "Architecture and Design of the Mars Hardware Accelerator", ACM 1987, pp. 101-107.

Case, "Implementing the Java Virtual Machine", Microprocessor Report, Mar. 1996.

Kitadeya et al., "Matsushita Launches Web TV Internet Connection Terminal", http://www.mei.co.jp/corp/news/official.data/data.dir/en981112-1/en981112-1.html, Nov. 1998.

iReady Product Data Sheet, Internet Tuner.

Johnson et al., "Internet Tuner", New Media News, http://www.newmedianews.com/020197/ts.sub_inettuner.html, Jan. 1997.

Kelly, T., "Cheap Internet Hardware that Fits in Everything", ZDNet, http://www.zdnet.co.uk/news/1998/44/ns-5998.html, Nov. 1998.

8802-3:2000 ISO/IEC Information Technology, http://www.computer.org/cspress/CATALOG/st01118.htm.

INCITS: Development work conducted in t10-I/O Interface-Lower Level Sep. 30, 2002 Weber, Ralph O.

Stevens, Richard W., "TCP/IP Illustrated Volume" Addison-Wesley Professional Computing Series.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Muller, Raimund, "LON—das universelle Netzwerk" Elektronik 22/1991.

Rang, Michael; Tantawy, Ahmed, "A Design Methodology for Protocol Processors" IEEE 1995.

Banks, David and Prudence, Michael, "A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1 Feb. 1997.

Doumenis, Gr.A., Konstantoulakis, G.E., Reisis, D.I.and Stassinopoulos, G.1. "A Personal Computer Hosted Terminal Adapter for the Broadband Integrated Services Digital Network and Applications" National Technical University of Athens, Greece.

Womack, Lucas; Mraz, Ronald; Mendelson, Abraham, "A Study of Virtual Memory MTU Reassembly wishing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization for A High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F.; Sebastia, A., "Electronic Design of a High Performance Interfacce to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN# 0-7803-2636-9.

Wright, Maury "Intelligent Ethernet Boards" EDN Jun. 23, 1988.

Preston, David "Internet Protocols Migrate to Silicon for Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.

Maly, K.; Khanna, K.; Kukkamala, R.; Overstreet C.M.; Yerraballi, R.; Foundriat, E.C.; Madan, B., "Parallel TCP/IP for Multiprocessor Workstations" High Performance Networking, IV, 1993 IFIP.

Laskman, T.V.; Madhow, U., "Performance Analysis of Window-based Flow Control using TCP/IP:Effect of High Bandwidth Delay Products and Random Loss" High Performance Networking V. 1994 IFIP.

Ramakrishnan, K.K., "Performance Considerations in Designing Network Interfaces" IEEE Journal 1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www.newmedianews.com/02197/ts_inettuner.html.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

Eady Product Data Sheet, Internet Tuner.

Luijten, Ronald P., "An OC-12 ATM Switch Adapter Chipset" 1998 IEEE.

"Less-Numerical Algorithms", Ch. 20 p. 888-895.

"Storage Networking Industry Association" iSCSI Building Blocks for IP Storage Networking, www.ipstorage.org.

Goto, H. et al. "Desktop All-in-One, Color Moving-Picture Videophone," The Hitachi Hyoron, 1992, vol. 74, No. 9, pp. 9-15.

Mitsubishi, Mitsubishi Denki Giho, 1993, vol. 67, No. 7, pp. 44-47 and 96.

Non-Final Office Action from U.S. Appl. No. 11/614,046, dated Apr. 6, 2009.

Final Office Action from U.S. Appl. No. 11/614,046, dated Nov. 6, 2009.

Advisory Action from U.S. Appl. No. 11/614,046, dated Mar. 5, 2010.

Non-Final Office Action from U.S. Appl. No. 11/614,046, dated May 25, 2010.

Examination Report from European Application No. 03757427, dated Nov. 17, 2008.

Examination Report from European Application No. 03757427, dated Apr. 14, 2010.

Examination Report from European Application No. 02728953, dated Jan. 29, 2009.

Notice of Final Rejection from Japanese Application No. 2004-512013, dated May 26, 2009.

Notice of Reasons for Rejection from Japanese Application No. 2004-512013, dated Sep. 9, 2008.
Notice for Preliminary Rejection from Japanese Application No. 2002-584131, dated Feb. 2, 2007.
Notice of Reasons for Rejection from Japanese Application No. 2008-139758, dated Apr. 12, 2011.
Notice of Final Rejection from Japanese Application 2002-584131, dated Jan. 29, 2008.
Supplementary European Search Report from European Application No. 03757427, dated Aug. 13, 2008.
Supplementary European Search Report from European Application No. 02728953, dated Jun. 16, 2008.
International Search Report from International Application No. PCT/US02/12889, dated Feb. 20, 2003.
International Search Report from International Application No. PCT/US03/18049, dated Oct. 8, 2003.
Non-Final Office Action from U.S. Appl. No. 10/131,118, dated Jun. 29, 2011.

* cited by examiner

INTEGRATED POLICY CHECKING SYSTEM AND METHOD

FIELD OF THE INVENTION

The present invention relates to network policy management, and more particularly to performing policy checking in an efficient manner.

BACKGROUND OF THE INVENTION

IPsec (Internet Protocol Security) is a framework for a set of protocols for security at a network or packet processing layer of network communication. Earlier security approaches inserted security at the application layer of the communications model. IPsec is thus particularly useful for implementing virtual private networks and for remote user access through various connections to private networks.

One advantage of IPsec is that security arrangements can be handled without requiring changes to individual user computers. IPsec provides two choices of security service. First provided is an authentication header (AH), which essentially allows authentication of the sender of data. Further provided is an encapsulating security payload (ESP), which supports both authentication of the sender and encryption of data as well. The specific information associated with each of these services is typically inserted into the packet in a header that follows the IP packet header.

In the context of the present description, a security association (SA) is defined as a relationship between two or more entities that describes how the entities utilize security services to communicate effectively. Physically, it may include a structure containing information on a set of agreements for communication including, for example, keys used for the decryption or authentication of packets. Moreover, a security parameter index (SPI) is combined with the destination IP and security protocol (AH or ESP) to uniquely specify an SA. Each AH and ESP header may, for example, contain a 32-bit SPI field.

Prior art FIG. 1 illustrates an exemplary framework 100 of IPSec layers and corresponding SAs in a packet, in accordance with the prior art. As shown, four (4) SAs are provided in the present exemplary framework 100. Of course, however, it should be noted that there could be as few as one and no theoretical limit (i.e. with iterated tunneling). Also note that there is an IP header separating the SAs.

The SAs are arbitrarily labeled A, B, C and D. Another packet may or may not use A, B, C or D, but instead use another SA, such as F (unillustrated). In use, each SA has a limited lifetime and a successor may be setup before it expires so that the successor can seamlessly replace it (without interrupting the connection). In the context of the present description, each generation of an SA is denoted by an associated index. For example, SA $F_5$ would succeed $F_4$, and so forth. It should be noted that the successor SA may have a completely different identity (SPI) and encryption/authentication keys with respect to any predecessor.

In the past, IPSec processing involving the foregoing framework 100 has typically been carried out utilizing a processor. However, such IPSec processing can be quite cumbersome for a processor, and further drain associated resources during use. Thus, there is a continuing need to integrate IPSec processing into transport offload engines.

Transport offload engines (TOE) are gaining popularity in high-speed systems for the purpose of optimizing throughput and lowering processor utilization. TOE components are often incorporated into one of various systems including printed circuit boards such as a network interface card (NIC), a host bus adapter (HBA), a motherboard; or in any other desired offloading context.

In recent years, the communication speed in networks has increased faster than processor speed. This increase has produced an input/output (I/O) bottleneck. The processor, which is designed primarily for computing and not for I/O, cannot typically keep up with the data flowing through networks. As a result, the data flow is processed at a rate slower than the speed of the network. TOE technology solves this problem by removing the burden from the processor (i.e. offloading processing) and/or I/O subsystem.

While a TOE may be used to offload a processor of IPSec-type processing, such processing is still quite expensive, even for the TOE. There is thus a need for more efficient techniques of performing IPSec-type processing in the context of a system equipped with a TOE.

SUMMARY OF THE INVENTION

A system and method are provided for validating a security service associated with packets communicated on a network. A hash of a security service associated with packets communicated on a network is generated. In use, the security service associated with the packets is validated utilizing the hash.

In embodiment, the security service may include any of the following: authentication, encryption, terms of use of authentication, and/or terms of use of encryption. For example, the security service may include at least one security association (SA), an inner-Internet Protocol (IP) header, etc. More particularly, as an option, the security service may include at least one Internet Protocol Security (IPSec) transformation.

In another embodiment, the hash may be generated utilizing a transport offload engine. Optionally, the hash may be order-dependent, fixed in length, etc. Still yet, the hash may be generated utilizing an XOR operation, a random number, etc. Further, the hash that is generated for a first instance of the security service may be the same as the hash that is generated for a subsequent instance of the security service. Moreover, the security service may include a plurality of security associations and inner-IP headers, and the corresponding hashes may be generated utilizing the same random number.

In use from a server socket (i.e. connection) perspective, upon receipt of a packet, it is determined whether the packet is a synchronize (SYN) packet. If it is determined that the packet is a SYN packet; the SYN packet, an associated Internet Protocol Security (IPSec) transformation, and the hash may be sent from a transport offload engine to a processor.

Thus, it may be determined whether the SYN packet is accepted. If the SYN packet is accepted, a control block may be generated which includes the hash. A SYN acknowledgment (SYN/ACK) packet may then be generated.

In use from a client socket perspective, a client connection is initially requested. Next, a control block is generated which includes the hash. Still yet, a SYN packet may be generated. After waiting for a response, a SYN/ACK packet may be received in response to the SYN packet.

A hash associated with the packet is then calculated, and a control block (which includes the hash) associated with the SYN/ACK packet is retrieved. If the hash associated with the SYN/ACK packet matches the hash associated with the control block, the SYN/ACK packet is accepted. Still yet, if the hash associated with the SYN/ACK packet matches the hash associated with the control block, a handshake ACK packet may be generated. On the other hand, if the hash associated with the SYN/ACK packet does not match the hash associated with the control block, the SYN/ACK packet may be rejected.

Still yet, if it is determined that the packet received is neither a SYN packet nor a SYN/ACK packet, a control block (which includes the hash) associated with the packet may be retrieved, similar to before. If a hash associated with the packet matches the hash associated with the control block, the packet may be accepted. If not, the packet may be rejected.

To this end, IPSec processing may optionally be offloaded from the processor, utilizing the transport offload engine. Further, the security service may be validated at a network protocol layer that resides above an IPSec protocol layer, to facilitate processing.

BRIEF DESCRIPTION OF THE DRAWINGS

Prior art

DETAILED DESCRIPTION

Figure 1:
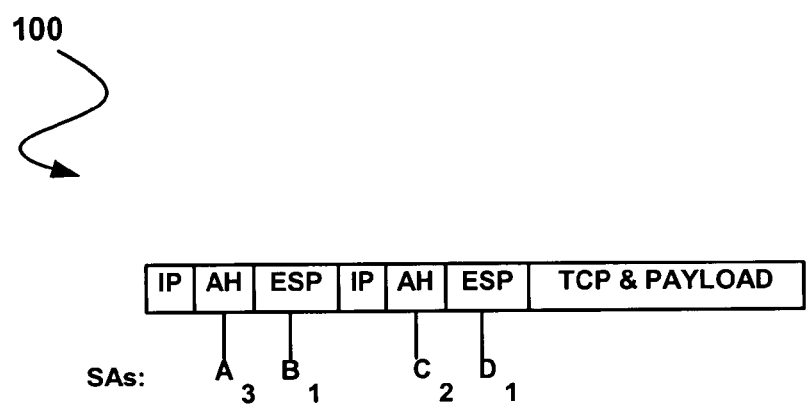
FIG. 1 illustrates an exemplary framework of Internet protocol security (IPSec) layers and corresponding security associations (SAs) in a packet, in accordance with the prior art.
Figure 2:
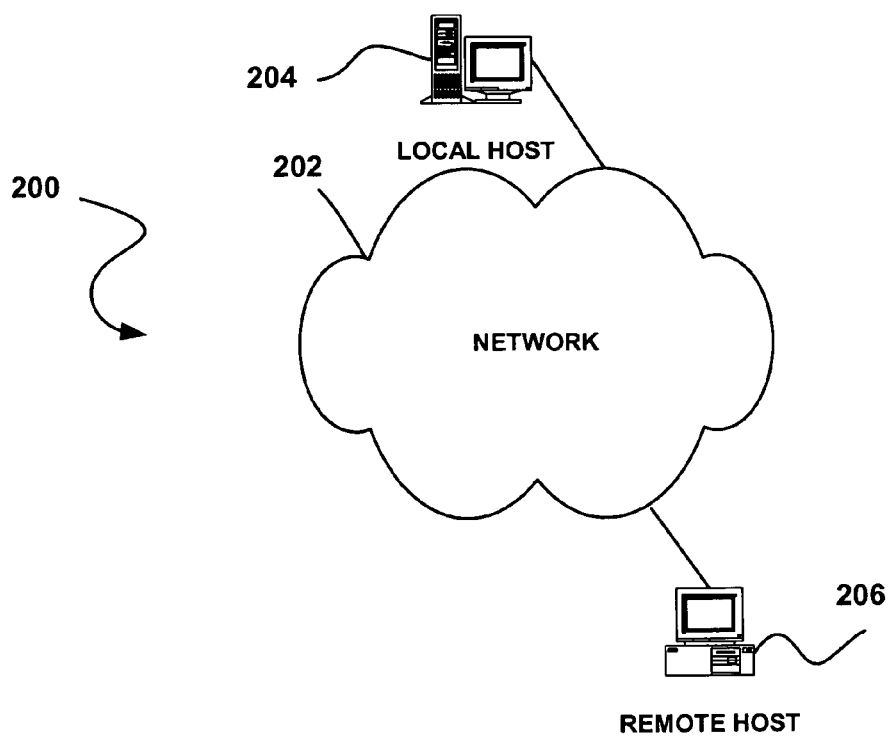
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, etc.

Coupled to the network 202 are a local host 204 and a remote host 206 which are capable of communicating over the network 202. In the context of the present description, such hosts 204, 206 may include a web server, storage device or server, desktop computer, lap-top computer, hand-held computer, printer or any other type of hardware/software. It should be noted that each of the foregoing components as well as any other unillustrated devices may be interconnected by way of one or more networks.

Figure 3:
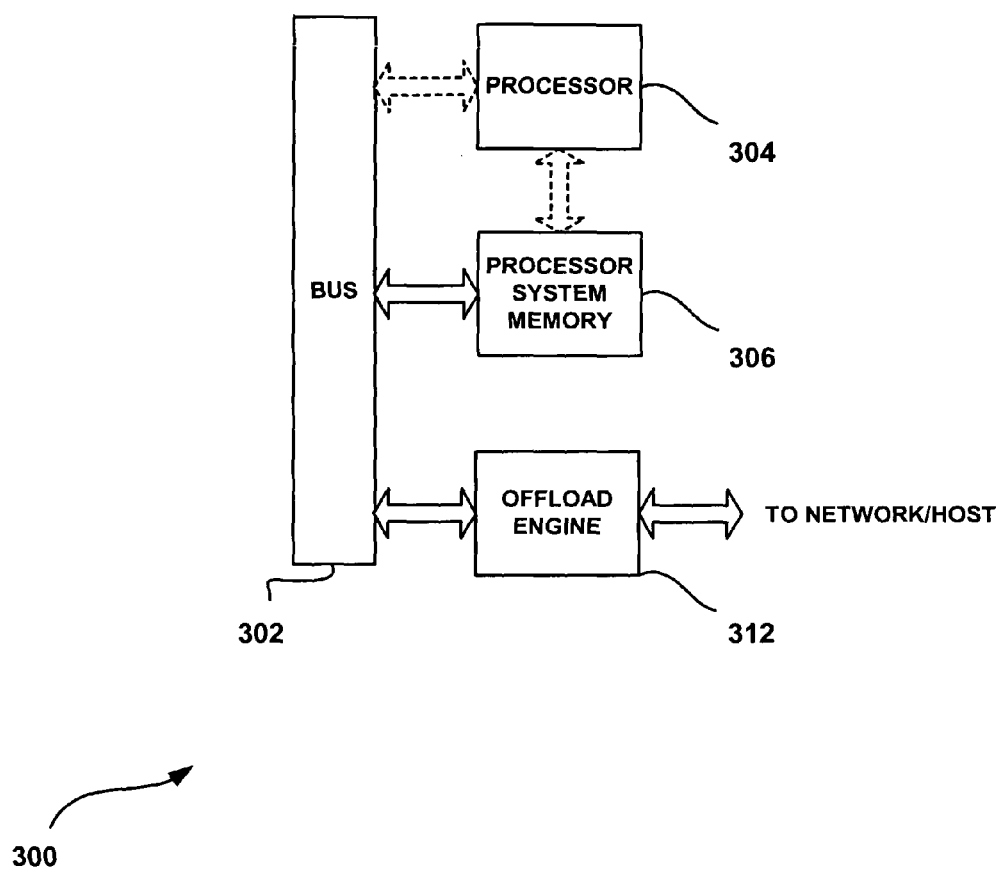
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context. For example, the architecture 300 may be implemented in the context of a general computer system, a circuit board system, a game console system dedicated for entertainment purposes, a set-top box, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a host processor, a chipset (i.e. a group of integrated circuits designed to work and sold as a unit for performing related functions, etc.), or any other desired processing device(s) capable of processing data.

Further included is processor system memory 306 which resides in communication with the processor 304 for storing the data. Such processor system memory 306 (e.g. a computer readable medium) may take the form of on-board or off-board random access memory (RAM), a hard disk drive, a removable storage drive (i.e., a floppy disk drive, a magnetic tape drive, a compact disk drive, etc.), and/or any other type of desired memory capable of storing data.

In use, programs, or control logic algorithms, may optionally be stored in the processor system memory 306. Such programs, when executed, enable the architecture 300 to perform various functions. Of course, the architecture 300 may simply be hardwired.

Further shown is a transport offload engine 312 in communication with the processor 304 and the network (see, for example, network 202 of FIG. 2). In one embodiment, the transport offload engine 312 may remain in communication with the processor 304 via the bus 302. Of course, however, the transport offload engine 312 may remain in communication with the processor 304 via any mechanism that provides communication therebetween. The transport offload engine 312 may include a transport (i.e. TCP/IP) offload engine (TOE), system, or any integrated circuit(s) that is capable of managing the data transmitted in the network.

While a single bus 302 is shown to provide communication among the foregoing components, it should be understood that any number of bus(es) (or other communicating mechanisms) may be used to provide communication among the components. Just by way of example, an additional bus may be used to provide communication between the processor 304 and processor system memory 306.

During operation, the transport offload engine 312, processor 304 and/or software works to validate a security service associated with packets communicated on a network. It should thus be noted that the present technology may be implemented in hardware, software, or both.

In the context of the present description, such security service may include any of the following: authentication, encryption, terms of use of authentication, terms of use of encryption and/or any service related to security. For example, the security service may include at least one security association (SA), an inner-Internet Protocol (IP) header, etc. Again, an SA may include a relationship between two or more entities that describes how the entities utilize a security service to communicate effectively. More information will be set forth regarding inner-IP headers during reference to FIG. 6. More particularly, as an option, the security service may include at least one Internet Protocol Security (IPSec) transformation.

To accomplish the aforementioned validation, a hash of the security service is generated by the transport offload engine 312, the processor 304, or any other mechanism (i.e. hardware and/or software). Thus, in use, the security service associated with the packets may be validated utilizing the hash.

To this end, security service validation may be carried out in an improved and/or more efficient manner. More information will now be set forth regarding one exemplary method by which the hash is generated and utilized in the foregoing manner.

Figure 4A:
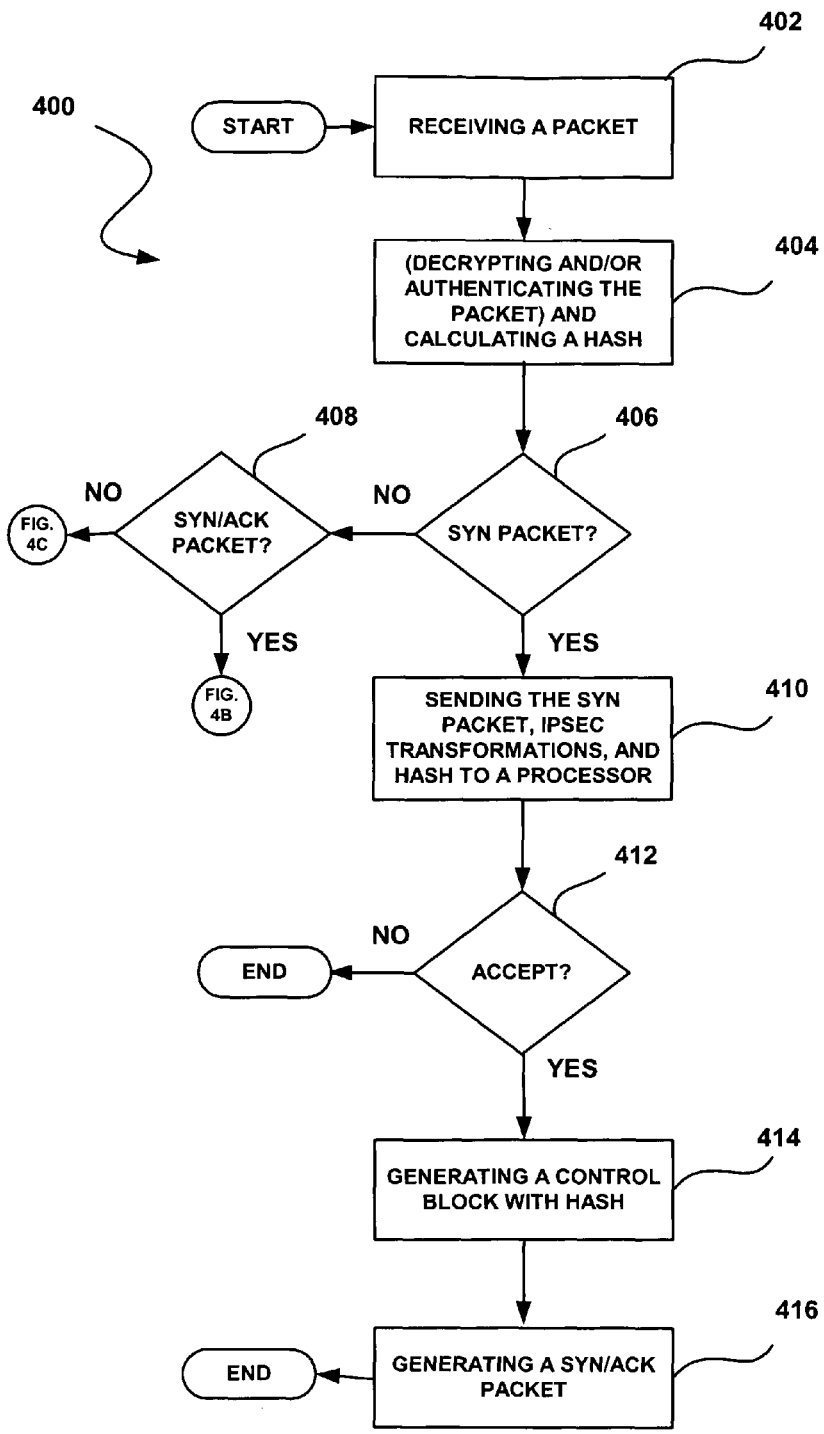
FIG. 4A illustrates an exemplary method for security service validation from a server socket (i.e. connection) perspective, in accordance with one embodiment.
Figure 4B:
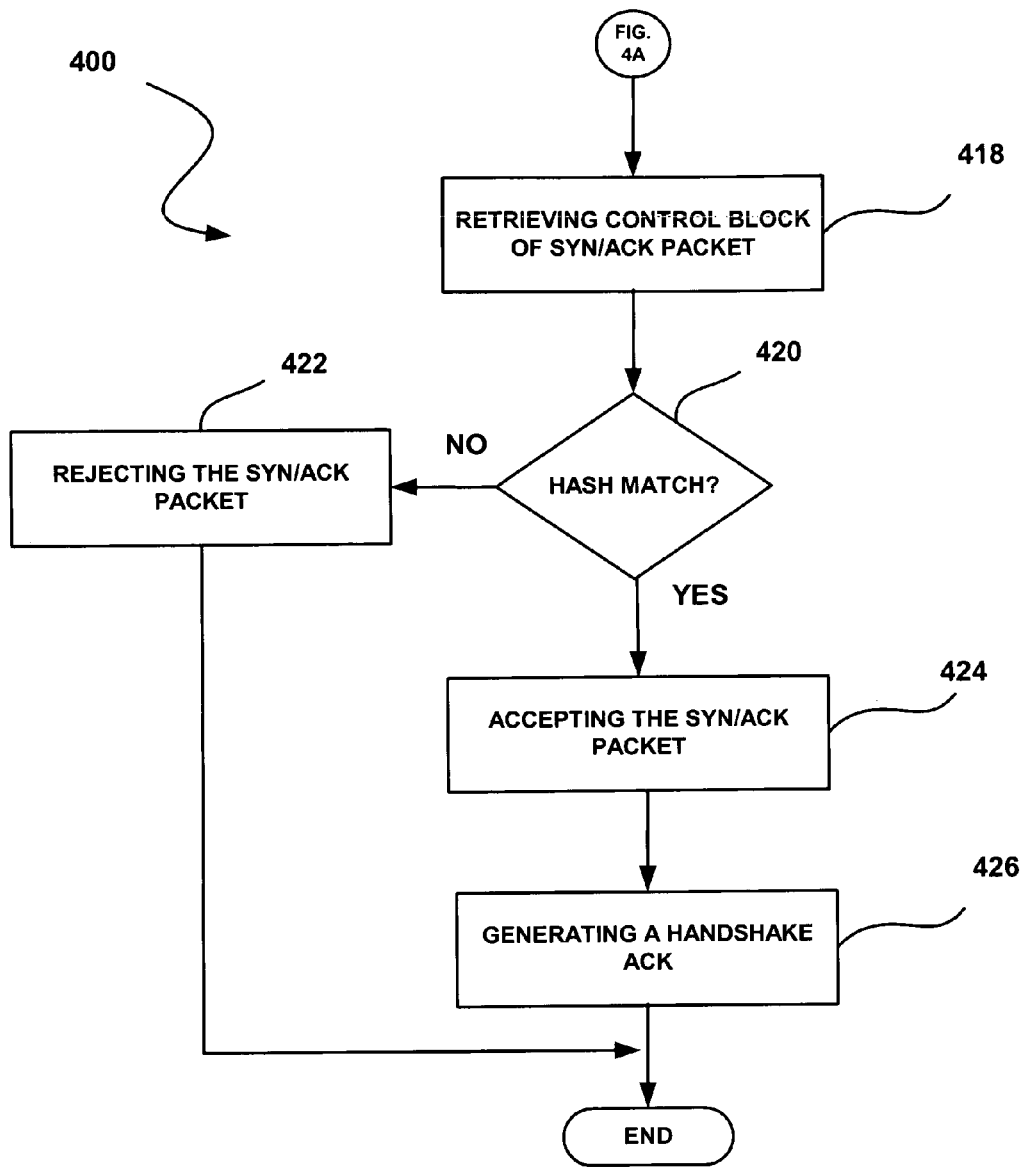
FIG. 4B illustrates a continuation of the security service validation method of FIG. 4A for operation when a synchronize acknowledgment (SYN/ACK) packet is received.
Figure 4C:
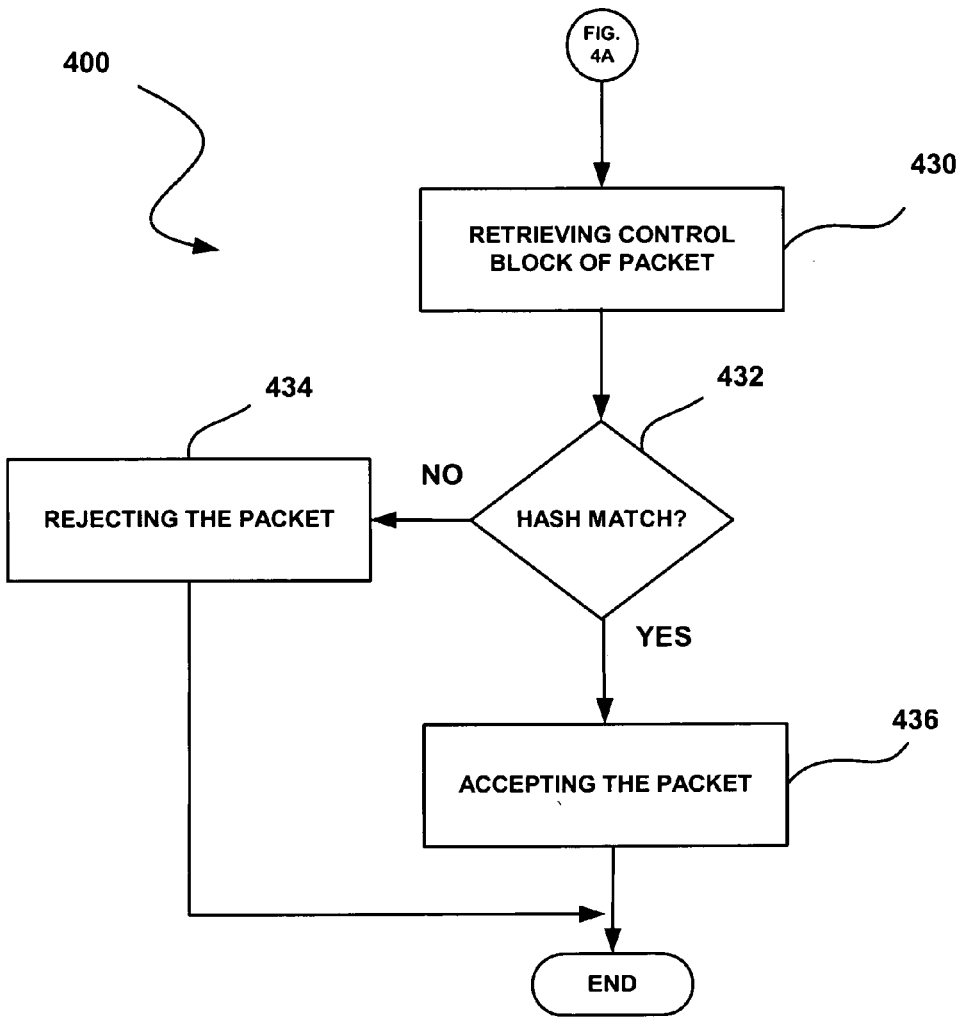
FIG. 4C illustrates a continuation of the security service validation method of FIG. 4A for operation when neither a SYN packet nor a SYN/ACK packet is received.

FIGS. 4A-C illustrate an exemplary method 400 for security service validation from a server socket (i.e. connection) perspective, in accordance with one embodiment. As an option, the method 400 may be carried out in the context of the exemplary architecture 300 of FIG. 3. Of course, however, it should be noted that the method 400 may be implemented in any desired context. Moreover, while various functions may be attributed to exemplary components (i.e. like those set forth hereinabove), it is important to understand that the various functionality may be carried out by any desired entity.

As shown in FIG. 4A, a packet is received. See operation 402. In one embodiment, the packet may be received utilizing a transport offload engine (see, for example, transport offload engine 312 of FIG. 3). Next, in operation 404, the packet is decrypted and/or authenticated, utilizing the transport offload engine. Such decryption and/or authentication may be accomplished utilizing an ordered-list of Internet Protocol Security (IPSec) transformations.

More information regarding this IPSec and related processing may be found with reference to an application entitled "GIGABIT ETHERNET ADAPTER SUPPORTING THE ISCSI AND IPSEC PROTOCOLS" filed Jun. 5, 2003 under Ser. No. 10/456,871, which is incorporated herein by reference in its entirety.

Thereafter, continued operation varies depending on whether the incoming packet includes a synchronize (SYN) packet, a SYN acknowledgment (SYN/ACK), or neither. Specifically, in decision 406, it is determined whether the present packet is a SYN packet. This may be accomplished utilizing the transport offload engine or a processor (see, for example, processor 304 of FIG. 3).

In the context of the present description, a SYN packet may include any packet, signal, etc. that initiates the synchronization process necessary to establish a connection. Moreover, the SYN packet may include a header flag identifying the packet as a SYN packet. Such flag may thus be used in making the decision 406. As will soon become apparent, such SYN packet may be received from a remote TCP host. More information regarding similar operation from a client socket perspective will be set forth in greater detail during reference to FIG. 5.

If the present packet is a SYN packet per decision 406, the decrypted and/or authenticated SYN packet, the IPSec transformations, and the hash are sent from the transport offload engine to the processor. See operation 410. To this end, the processor is capable of performing further IPSec processing on the SYN packet. Specifically, the processor may perform IPSec policy checking at the TCP layer to determine whether the SYN packet (and the related connection) should be allowed.

If the IPSec policy checking is successful and the processor determines that the SYN packet (and the related connection) should be allowed (see decision 412), a control block is generated which includes the hash, utilizing the transport offload engine. Note operation 414. In the context of the present description, the control block may include any data structure including the hash and any other information capable of facilitating network socket management.

Optionally, the aforementioned hash may be order-dependent, fixed in length, etc. Still yet, the hash may be generated utilizing an XOR operation, a random number, etc. Such random number may further be unique to a security association, and any descendents of the security association. Further, the hash that is generated for a first instance of the security service may be the same as the hash that is generated for a subsequent instance of the security service. In any case, in the context of the present description, the hash may include any unique (or substantially unique) key associated with the security service (as defined herein). More information regarding one exemplary way in which the hash may be calculated will be set forth during reference to FIG. 6.

A SYN/ACK packet may then be generated and sent in response to the SYN packet, utilizing the transport offload engine. Note operation 416. Such SYN/ACK packet may serve as the second of three packets that, together, are capable of establishing a socket connection.

Returning to decision 406 of FIG. 4A, if the present packet is not a SYN packet, it is then determined whether the packet is a SYN/ACK packet in decision 408. If so, the process continues in FIG. 4B, as indicated.

With reference now to FIG. 4B, a control block (which includes the aforementioned hash) associated with the SYN/ACK packet may be retrieved. See operation 418. In particular, the control block associated with the connection corresponding with the SYN/ACK packet may be retrieved. To this end, a comparison of the hashes may be made by the transport offload engine, as indicated by decision 420.

As an option, an IPSec enable bit may be included in a control block associated with a socket connection. The IPSec enable bit may be used to indicate whether the associated connection should be IPSec protected or not. When a packet is received, a bit is tracked along with the packet to indicate whether the packet received included any IPSec protocols. In this manner, the IPSec bit tracked with the received packet may be compared to the IPSec enable bit in the control block associated with the received packet. If the two aforementioned bits do not match, then the packet may be rejected. A secondary measure of integrity is thus provided over and above that provided by the use of the hash.

Returning now to FIG. 4B, if the hash associated with the SYN/ACK packet matches the hash associated with the control block, the SYN/ACK packet may be accepted. See operation 424. In such case, a handshake ACK packet may be generated and sent over the network, thus completing the connection establishment process. Note operation 426. On the other hand, if the hash associated with the SYN/ACK packet does not match the hash associated with the control block (per decision 420), the SYN/ACK packet may be rejected. Note operation 422.

Returning again to FIG. 4A, if it is determined that the packet is neither a SYN packet nor a SYN/ACK packet (note operations 406 and 408), operation may continue per FIG. 4C. Specifically, a control block (which includes the hash) associated with the packet may be retrieved, similar to before. See operation 430. If a hash associated with the packet matches the hash associated with the control block (per decision 432), the packet may be accepted. See operation 436. If, not, the packet may be rejected, as indicated in operation 434.

Similar to before, an IPSec enable bit indicating whether IPSec protocols should be used on the socket connection may be extracted from the control block associated with the received packet at this point in time. The IPSec enable bit, is then compared to a bit which indicates whether the received packet included at least one IPSec protocol. Assuming that there is a match, operation may continue as follows. Otherwise, a failed match may terminate further operation.

Figure 5:
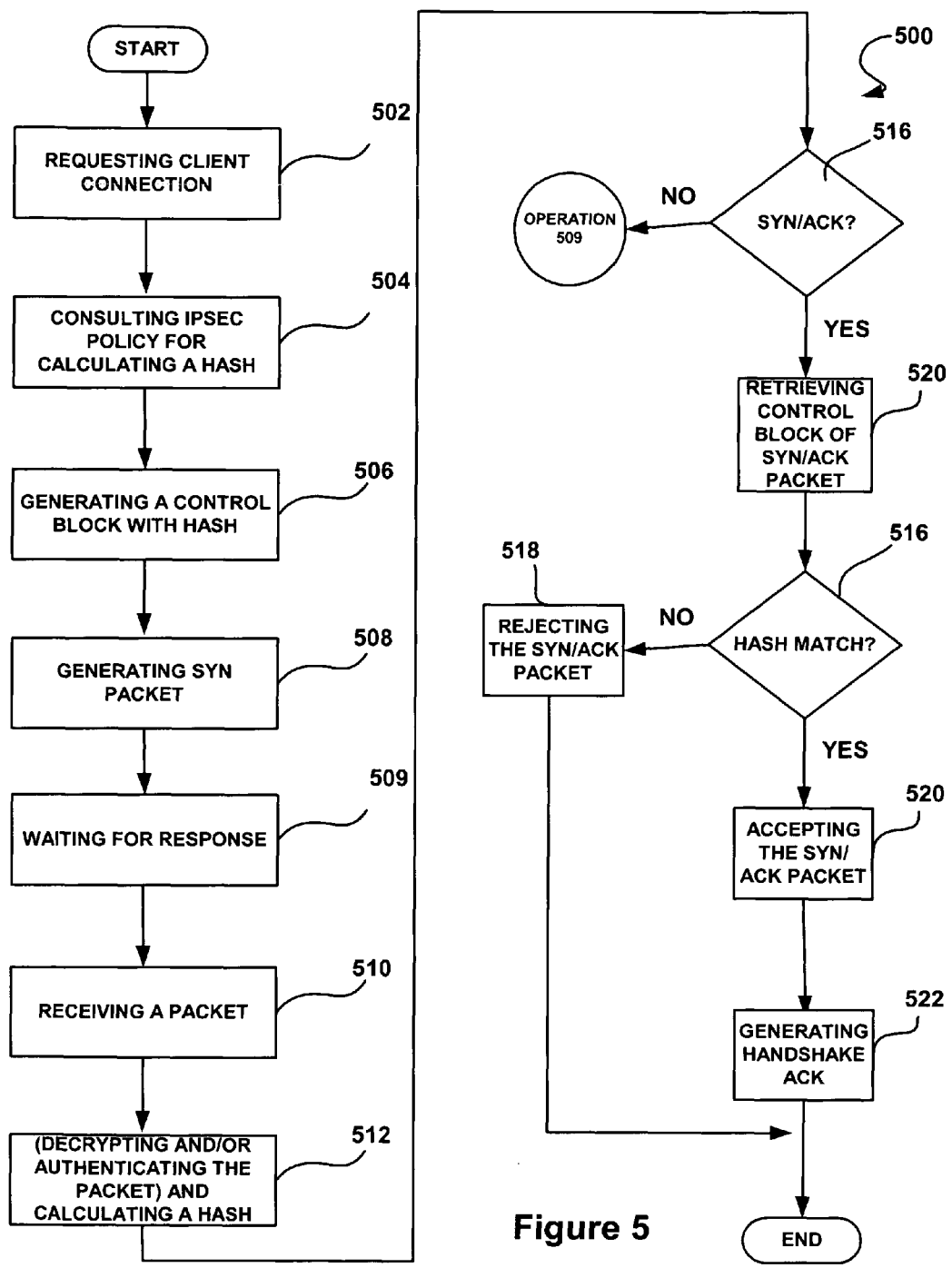
FIG. 5 illustrates an exemplary method for security service validation from a client socket perspective, in accordance with one embodiment.

FIG. 5 illustrates an exemplary method 500 for security service validation from a client socket (i.e. connection) perspective, in accordance with one embodiment. As an option, the method 500 may be carried out in the context of the exemplary architecture 500 of FIG. 3 and, in combination with the server method 400 of FIGS. 4A-4C Of course, however, it should be noted that the method 500 may be implemented in any desired, sole context. Moreover, while various functions may be attributed to exemplary components (i.e. like those set forth hereinabove), it is important to understand that the various functionality may be carried out by any desired entity.

As shown, a client connection is initially requested, as indicated in operation 502. This may be accomplished in any desired manner. Just by way of example, a processor (see, for example, processor 304 of FIG. 3) may initiate the connection establishment process. Next, IPSec processing is performed in operation 504. Specifically, at least one IPSec policy is consulted or used for calculating a hash in a manner similar, if not identical, to that described hereinabove.

Next, in operation 506, a control block is generated which includes the hash, utilizing the transport offload engine. Still yet, in operation 508, a SYN packet may be generated and transmitted to a remote TCP host.

At this point, the present method 500 waits for a SYN/ACK packet response in operation 509, assuming that the hash is legitimate. After waiting for a response, the SYN/ACK packet may be received in operation 510.

A hash associated with the packet is then calculated in operation 512 during the course of either a decryption and/or authentication of the packet, similar to that disclosed during reference to operation 404 of FIG. 4A. Since, from the client perspective, many different packet types may be received after generating the SYN packet in operation 508, it is determined in decision 516 whether the packet received in operation 510 is a SYN/ACK packet. If the packet is indeed a SYN/ACK packet per decision 516, a control block (which includes the earlier calculated hash) associated with the connection of the SYN/ACK packet is retrieved. Note operation 520.

Another comparison operation is then made in decision 516. If the hash associated with the SYN/ACK packet matches the hash associated with the control block, the SYN/ACK packet is accepted. See operation 520. Moreover, a handshake ACK may be generated and transmitted in response to the SYN/ACK packet, as indicated in operation 522. Subsequent incoming packets after the handshake ACK is transmitted are processed in accordance to FIGS. 4A-C. If, however, the hash associated with the SYN/ACK packet does not match the hash associated with the control block, the SYN/ACK packet is rejected in operation 518.

To this end, IPSec processing may optionally be offloaded from the processor, utilizing the transport offload engine. Further, the security service may be validated at a network protocol layer that resides above the IPSec protocol layer, to facilitate processing. More information will now be set forth regarding one exemplary technique by which the aforementioned hashes may be calculated.

Figure 6:
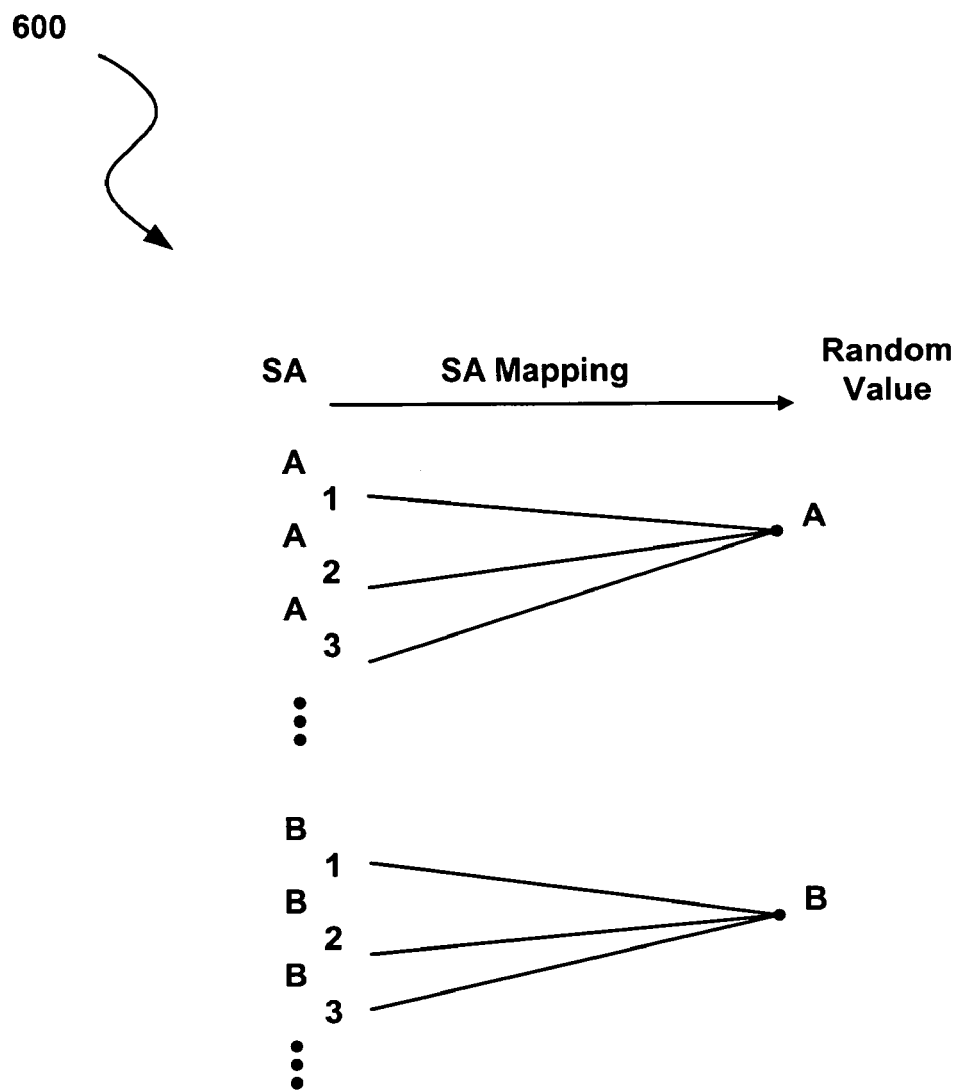
FIG. 6 illustrates an exemplary framework for generating a hash, in accordance with one embodiment.

FIG. 6 illustrates an exemplary framework 600 involved in generating a hash, in accordance with one embodiment. As an option, the framework 600 may be used in the context of the disclosure of the previous figures. For example, the framework 600 may be used in the context of operations 404 of FIG. 4A, and operations 504 and 512 of FIG. 5.

Of course, however, it should be noted that the framework 500 may be implemented in any desired context. Most importantly, the exemplary framework 500 is set forth for illustrative purposes only, and should not be considered as limiting in any manner.

In use, a function is applied to a plurality of security associations (SAs) and inner-IP headers. Such function, in one embodiment, may include an order-dependent XOR checksum with rotate operation. Note Equation (s) #1.

$$H' = ROL(H) \text{ XOR } RAND[x]$$ Equation(s) #1

As shown, RAND[x] includes a random value stored in the SA for SA handle 'x', where a handle includes an identifier that references a particular SA. There is also a special case denoted by 'RAND[IP]' where IP denotes the encounter of any inner-IP header instead of an SA handle, and is stored separately. Moreover, ROL is a rotate-left operator. H' includes the new hash value, while H includes the old hash value (initially set to 0).

Thus, to apply to an ordered list of SA handles and IP headers {s, t, IP, u}, where 'IP' denotes the encounter of an inner IP header, the operations of Equation (s) #2 would be carried out.

$$H = 0$$

$$H' = ROL(H) \text{ XOR } RAND[s]$$

$$H'' = ROL(H') \text{ XOR } RAND[t]$$

$$H''' = ROL(H'') \text{ XOR } RAND[IP]$$

$$H'''' = ROL(H''') \text{ XOR } RAND[u]$$ Equation(s) #2

By this design, an attacker cannot successfully use the same SA handle as the host it is trying to spoof without knowing the hash for that SA-handle. Therefore, an attacker may use a different SA handle, and this results in another random hash value.

Thus, in the present embodiment, it is still possible for an attacker to use a brute force attack. The number of tries needed to randomly collide with a given hash with probability ½ is $\ln(2)*(2^{32})$ for a 32-bit hash. To protect against this, an exception may be generated by the transport offload engine when there is an authenticated packet that does not have a matching hash. This may be used as a strong indicator of an attack.

It is improbable that a corrupted TCP/IP packet would pass TCP checksum, IP checksum, and authentication; but then fail the hash test. In this case, the best course of action may be to deny or limit further Internet security association and key management protocol (ISAKMP) establishment with the attacker source IP address. The attacker thus has a very high probability of being identified because the hash used would be the attacker's hash, which has a probability of at most $(2^{16})/(2^{32}) = 1/(2^{16})$ of colliding with another hash. This assumes at most $2^{16}$ SAs are supported on the receive side. If more SAs are to be supported, the number of bits for the hash should be increased.

To further increase confidence, subsequent attempts by the attacker again have only a $1/(2^{16})$ chance of colliding, therefore after 'p' attempts there is only a $1/(2^{16})^p$ chance of ambiguous identity. Since on the order of $2^{16}$ attempts are needed to successfully spoof the connection, it can be assured that the attacker can be identified and further ISAKMP negotiations with him/her halted until all existing SAs have retired (that is, until the system is outside the scope of this attack).

Thus, the aforementioned function yields one number H, the hash. As mentioned earlier, this hash may be compared against pre-calculated stored values in a connection management database/data structure which may be re-calculated as part of establishing a connection (based on an actual IPSec policy database, etc.). Each packet may thus be accepted or rejected based on a similar comparison.

In one embodiment, the aforementioned function may ensure that only packets with the following SAs and IP headers of Table #1 are acceptable (in order).

TABLE 1

$(A_i, B_j, IP, C_k, D_l)$ for all i, j, k, l

Thus, a packet may be rejected if the associated SAs are in the wrong order. Note Table #2.

TABLE 2

$(B_1, A_0, IP, C_3, D_2)$

Further, a packet may be rejected if the packet has too few or too many SAs. Note Table #3.

TABLE 3

$(A_1, B_3, IP, C_2)$

Still yet, a packet may be rejected if the packet has a wrong SA(s). Note Table #4.

TABLE 4

$(A_0, F_5, IP, C_3, D_2)$

Still yet, a packet may be rejected if the packet has too many or too few IP headers. Note Table #5.

TABLE 5

$(A_0, B_5, IP, C_3, D_2, IP)$

Still yet, a packet may be rejected if the packet has IP headers in the wrong position. Note Table #6.

TABLE 6

$(A_0, B_5, C_3, IP, D_2)$

Thus, a one-time-pad may be applied so that each current and future $A_k$ (where k=0 . . . x) maps to one fixed (randomly chosen) value, which may be subsequently used as a substitute, at least in part, for resource-intensive conventional IPSec processing.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for validating a security service associated with packets communicated on a network, comprising:
  receiving a packet at a transport offload engine;
  decrypting and authenticating the packet utilizing the transport offload engine, the decrypting utilizing an Internet Protocol Security (IPSec) transformation;
  calculating a hash of a security service based on the packet, utilizing the transport offload engine;
  determining whether the packet is a SYN packet utilizing the transport offload engine;
  in response to a determination that the packet is a SYN packet:
    sending the SYN packet from the transport offload engine to a processor,
    sending the IPSec transformation from the transport offload engine to the processor, and
    sending the hash from the transport offload engine to the processor; performing IPSec policy checking of the SYN packet utilizing the processor;
  determining that the SYN packet and a connection related to the SYN packet are allowed based on the IPSec policy checking, utilizing the processor;
  in response to the determination that the SYN packet and the related connection are allowed, and prior to generating a SYN/ACK packet, generating a control block including the hash utilizing the transport offload engine, the control block for network socket management;
  generating the SYN/ACK packet based on the SYN packet, utilizing the transport offload engine; and
  sending the SYN/ACK packet utilizing the transport offload engine.

2. The method as recited in claim 1, wherein the security service includes at least one of: authentication, encryption, terms of use of authentication, and terms of use of encryption.

3. The method as recited in claim 2, wherein the security service includes at least one of a security association and an inner-Internet Protocol (IP) header.

4. The method as recited in claim 2, wherein the security service includes the IPSec transformation.

5. The method as recited in claim 1, wherein the hash is order-dependent.

6. The method as recited in claim 1, wherein the hash has a fixed length.

7. The method as recited in claim 1, wherein the hash is generated utilizing an XOR operation.

8. The method as recited in claim 1, wherein the hash is generated utilizing a random number.

9. The method as recited in claim 8, wherein the random number is unique to a security association and any descendents of the security association.

10. The method as recited in claim 1, wherein the hash that is generated for a first instance of the security service is the same as the hash that is generated for a subsequent instance of the security service.

11. The method as recited in claim 1, and further comprising determining whether the packet is a synchronize acknowledgement (SYN/ACK) packet.

12. The method as recited in claim 11, if it is determined that the packet is the SYN/ACK packet, further comprising retrieving another control block associated with the SYN/ACK packet, which includes another hash.

13. The method as recited in claim 12, wherein, if the another hash associated with the SYN/ACK packet matches the hash associated with the control block, further comprising accepting the SYN/ACK packet, and generating a handshake ACK packet.

14. The method as recited in claim 12, wherein, if the another hash associated with the SYN/ACK packet matches the hash associated with the control block, further comprising generating a handshake ACK packet.

15. The method as recited in claim 12, wherein, if the another hash associated with the SYN/ACK packet does not match the hash associated with the control block, further comprising rejecting the SYN/ACK packet.

16. The method as recited in claim 1, and further comprising determining whether the packet is neither a synchronize (SYN) packet nor a synchronize acknowledgement (SYN/ACK) packet.

17. The method as recited in claim 16, if it is determined that the packet is neither the SYN packet nor the SYN/ACK packet, further comprising retrieving another control block associated with the packet, which includes another hash.

18. The method as recited in claim 17, wherein, if the another hash associated with the packet matches the hash associated with the control block, further comprising accepting the packet.

19. The method as recited in claim 17, wherein, if the another hash associated with the packet does not match the hash associated with the control block, further comprising rejecting the packet.

20. The method as recited in claim 1, and further comprising requesting a client connection.

21. The method as recited in claim 20, and further comprising generating another synchronize (SYN) packet.

22. The method as recited in claim 21, and further comprising receiving another SYN/ACK packet in response to the another SYN packet.

23. The method as recited in claim 22, and further comprising calculating another hash associated with the another SYN/ACK packet.

24. The method as recited in claim 23, wherein, if the another hash associated with the another SYN/ACK packet matches the hash associated with the control block, further comprising accepting the another SYN/ACK packet, and generating a handshake ACK packet.

25. The method as recited in claim 23, wherein, if the another hash associated with the another SYN/ACK packet does not match the hash associated with the control block, further comprising rejecting the another SYN/ACK packet.

26. The method as recited in claim 1, wherein the security service is validated at a network protocol layer that resides above an IPSec protocol layer.

27. The method as recited in claim 1, wherein at least one of the decrypting and the authenticating is performed on the packet utilizing an ordered-list of IPSec transformations.

28. The method as recited in claim 1, wherein the IPSec transformation includes an IPSec transformation utilized to perform the decrypting and the authenticating on the packet.

29. The method as recited in claim 1, wherein the hash is calculated utilizing an order-dependent XOR checksum with rotate operation.

30. The method as recited in claim 1, wherein when an authenticated packet is received that does not have a matching hash, the transport offload engine generates an exception and limits Internet security association and key management protocol (ISAKMP) establishment with a source IP address associated with the authenticated packet.

31. The method as recited in claim 1, wherein the hash of the security service based on the packet is calculated utilizing a security association, an ordered list of security association handles, and a plurality of IP headers.

32. The method as recited in claim 31, wherein the hash of the security service is calculated by:
setting an initial hash value to 0;
calculating a first rotate-left value by performing a rotate-left operation on the initial hash value;
calculating a first random value utilizing a first of the plurality of IP headers and a first of the security association handles associated with the first of the plurality of IP headers;
calculating a first hash value by performing an XOR operation between the first rotate-left value and the first random value;
calculating a second rotate-left value by performing a rotate-left operation on the first hash value;
calculating a second random value utilizing a second of the plurality of IP headers and a second of the security association handles associated with the second of the plurality of IP headers;
calculating a second hash value by performing an XOR operation between the second rotate-left value and the second random value;
calculating a third rotate-left value by performing a rotate-left operation on the second hash value;
calculating a third random value utilizing an inner IP header of the plurality of IP headers and a third of the security association handles associated with the inner IP header of the plurality of IP headers;
calculating a third hash value by performing an XOR operation between the third rotate-left value and the third random value;
calculating a fourth rotate-left value by performing a rotate-left operation on the third hash value;
calculating a fourth random value utilizing a fourth of the plurality of the IP headers and a fourth of the security association handles associated with the fourth of the plurality of IP headers; and
calculating the hash by performing an XOR operation between the fourth rotate-left value and the fourth random value.

33. A transport offload engine sub-system, comprising:
a transport offload engine, which includes a tangible circuit, in communication with a hardware processor and a network, the transport offload engine for:
receiving a packet,
decrypting and authenticating the packet, the decrypting utilizing an Internet Protocol Security (IPSec) transformation,
calculating a hash of a security service based on the packet,
determining whether the packet is a SYN packet,
in response to a determination that the packet is a SYN packet, sending the SYN packet to a processor, sending the IPSec transformation to the processor, and sending the hash to the processor for performing IPSec policy checking of the SYN packet and determining that the SYN packet and a connection related to the SYN packet are allowed based on the IPSec policy checking, utilizing the processor,
in response to the determination that the SYN packet and the related connection are allowed, and prior to generating a SYN/ACK packet, generating a control block including the hash, the control block for network socket management,
generating the SYN/ACK packet based on the SYN packet, and
sending the SYN/ACK packet.

34. A system, comprising:
a hardware processor; and
a transport offload engine in communication with the hardware processor and a network via a bus, the transport offload engine for:
receiving a packet,
decrypting and authenticating the packet, the decrypting utilizing an Internet Protocol Security (IPSec) transformation, calculating a hash of a security service based on the packet, determining whether the packet is a SYN packet, in response to a determination that the packet is a SYN packet:
- sending the SYN packet from the transport offload engine to the processor,
- sending the IPSec transformation from the transport offload engine to the processor, and
- sending the hash from the transport offload engine to the processor, in response to a determination that the SYN packet and the related connection are allowed, and prior to generating a SYN/ACK packet, generating a control block including the hash, the control block for network socket management, generating the SYN/ACK packet based on the SYN packet, and sending the SYN/ACK packet;

wherein the hardware processor is operable to:
- perform IPSec policy checking of the SYN packet, and
- determine that the SYN packet and a connection related to the SYN packet are allowed based on the IPSec policy checking.

35. A computer program product embodied on a non-transitory computer readable medium for validating a security service associated with packets communicated on a network, comprising:

computer code for receiving a packet at a transport offload engine;

computer code for decrypting and authenticating the packet utilizing the transport offload engine, the decrypting utilizing an Internet Protocol Security (IPSec) transformation;

computer code for calculating a hash of a security service based on the packet, utilizing the transport offload engine;

computer code for determining whether the packet is a SYN packet utilizing the transport offload engine;

computer code for, in response to a determination that the packet is a SYN packet:
- sending the SYN packet from the transport offload engine to a processor,
- sending the IPSec transformation from the transport offload engine to the processor, and
- sending the hash from the transport offload engine to the processor;

computer code for performing IPSec policy checking of the SYN packet utilizing the processor;

computer code for determining that the SYN packet and a connection related to the SYN packet are allowed based on the IPSec policy checking, utilizing the processor;

computer code for, in response to the determination that the SYN packet and the related connection are allowed, and prior to generating a SYN/ACK packet, generating a control block including the hash utilizing the transport offload engine, the control block for network socket management;

computer code for generating the SYN/ACK packet based on the SYN packet, utilizing the transport offload engine; and computer code for sending the SYN/ACK packet utilizing the transport offload engine.

* * * * *